(12) United States Patent
Guo et al.

(10) Patent No.: US 9,645,441 B2
(45) Date of Patent: May 9, 2017

(54) BACKLIGHT AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junjie Guo, Beijing (CN); Hongyu Zhao, Beijing (CN); Yutao Hao, Beijing (CN); Jinku Lv, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 86 days.

(21) Appl. No.: 14/547,172

(22) Filed: Nov. 19, 2014

(65) Prior Publication Data

US 2015/0355484 A1 Dec. 10, 2015

(30) Foreign Application Priority Data

Jun. 5, 2014 (CN) .......................... 2014 1 0246806

(51) Int. Cl.
*G02F 1/1333* (2006.01)
*G02F 1/1335* (2006.01)
*F21V 8/00* (2006.01)

(52) U.S. Cl.
CPC ........... *G02F 1/1336* (2013.01); *G02B 6/005* (2013.01); *G02B 6/0031* (2013.01);
(Continued)

(58) Field of Classification Search
CPC ............. G02F 1/1336; G02F 1/133606; G02F 1/133317; G02F 2001/133322; G02F 2201/54; G02B 6/005; G02B 6/0031
(Continued)

(56) References Cited

U.S. PATENT DOCUMENTS 7,184,110 B2 * 2/2007 Kim .................. G02F 1/133608
349/58
8,870,439 B2 * 10/2014 Cheng .................... G02B 6/005
362/632
(Continued)

FOREIGN PATENT DOCUMENTS

| CN | 102519011 A | 6/2012 |
| CN | 103148459 A | 6/2013 |
| JP | H07281206 A | 10/1995 |

OTHER PUBLICATIONS

Office Action dated Nov. 30, 2015 issued in corresponding Chinese Application No. 201410246806.9.

*Primary Examiner* — Hoan C Nguyen
(74) *Attorney, Agent, or Firm* — Nath, Goldberg & Meyer; Joshua B. Goldberg

(57) ABSTRACT

The present invention provides a backlight and a display device. The backlight includes a frame and an optical film set including a plurality of optical films that are successively stacked. Each optical film in the optical film set includes a film body and an ear part. In any two adjacent optical films, the boundary of at least one side of the ear part of the lower optical film extends beyond the boundary of the same side of the ear part of the upper optical film. A fixing member covers the ear parts of the plurality of optical films, such that the optical film set is fixed on the frame, and the fixing member can fix the relative positions among the plurality of optical films in the optical film set. In the backlight, the optical film set is reliably fixed without affecting the normal display on the display device.

17 Claims, 4 Drawing Sheets

(52) U.S. Cl.
CPC ............... *G02F 1/133608* (2013.01); *G02F 2001/133317* (2013.01); *G02F 2001/133322* (2013.01); *G02F 2201/54* (2013.01)

(58) Field of Classification Search
USPC .............................................. 349/58, 61–62
See application file for complete search history.

(56) References Cited

U.S. PATENT DOCUMENTS

| | | | |
|---|---|---|---|
| 2003/0043310 A1* | 3/2003 | Cho | G02B 6/0086 349/58 |
| 2003/0223020 A1* | 12/2003 | Lee | G02B 6/0088 349/58 |
| 2006/0088270 A1* | 4/2006 | Fan | G03B 21/64 385/147 |
| 2007/0183149 A1* | 8/2007 | Ko | G02F 1/133604 362/225 |
| 2009/0103004 A1 | 4/2009 | Su et al. | |
| 2009/0262277 A1* | 10/2009 | Kim | G02F 1/133308 349/58 |
| 2014/0104872 A1* | 4/2014 | Shin | G09F 13/18 362/607 |
| 2014/0268868 A1* | 9/2014 | Hatta | G02F 1/133606 362/606 |

\* cited by examiner

A-A'

BACKLIGHT AND DISPLAY DEVICE

FIELD OF THE INVENTION

The present invention relates to the field of display technology, and particularly, to a backlight and a display device including the backlight.

BACKGROUND OF THE INVENTION

As shown in FIG. 1 (the prior art), a liquid crystal display device generally includes a liquid crystal display panel 200 and a backlight 100 providing a light source for the liquid crystal display panel 200, wherein the backlight 100 includes a metal frame 110, a frame 120, an optical film set 130, a light guide plate 140, a rear plate 150, a reflector plate 160 and light emitting elements (not shown). As shown in FIG. 1, the frame 120 is provided between the side wall of the metal frame 110 and the side wall of the rear plate 150. The frame 120 has a supporting part formed protruding toward the middle part of the backlight. This supporting part can fix the optical film set 130, the light guide plate 140 and the reflector plate 160 onto the rear plate 150, while the upper surface of the supporting part is used to support the liquid crystal display panel 200. The supporting part has a certain width in order to prevent the optical film set from moving. Generally, the supporting part may extend into the effective display area of the liquid crystal display panel 200, that is, the right side of the dashed line in FIG. 1.

The supporting part of the frame 120 extends into the effective display area, resulting in a black frame formed within the effective display area and thus causing an adverse impact on the normal display of the liquid crystal display panel.

FIG. 2 (the prior art) shows a part of a backlight in another implementation. As shown in FIG. 2, in order to prevent optical films from moving relative to each other, each optical film in the optical film set 130 may include a film body 131 and an ear part 132, and a via is provided on the ear part 132. The frame 120 includes a covering part 121 and a protruding part 122. The protruding part 122 passes through the via on the ear part 132, so as to fix the relative positions among the plurality of optical films and prevent the optical films from moving relative to each other. However, it can be seen from the FIG. 2 that the covering part 121 of the frame 120 does not cover the optical film set 130. Accordingly, although the implementation shown in FIG. 2 can prevent a black frame from appearing in the effective display area, to a certain extent, the optical film is easily to be wrapped due to not being pressed, which leads to black lines, moiré effect, damage to the lower polarizer of the liquid crystal display panel, and the like.

Accordingly, how to fix an optical film set reliably without affecting the normal display on the liquid crystal display panel is a technical problem needs to be solved urgently in the art.

SUMMARY OF THE INVENTION

An objective of the present invention is to provide a backlight and a display device including the backlight. In the backlight, an optical film set is fixed reliably without affecting the normal display on the display device.

To achieve the above objective, as an aspect of the present invention, a backlight is provided. The backlight includes a frame and an optical film set, and the optical film set includes a plurality of optical films that are successively stacked, wherein the backlight further includes a fixing member, the frame includes a supporting part protruding toward the middle part of the backlight, the optical film set is provided on the supporting part, and each optical film in the optical film set includes a film body and an ear part protruding from a side of the film body. In any two adjacent optical films, the boundary of at least one side of the ear part of the lower optical film extends beyond the boundary of the same side of the ear part of the upper optical film. The fixing member covers the ear parts of the plurality of optical films, such that the optical film set is fixed on the frame. The fixing member can fix the relative positions among the plurality of optical films in the optical film set.

Preferably, in the two adjacent optical films, both sides of the ear part of the lower optical film extend beyond both sides of the ear part of the upper optical film, respectively.

Preferably, the fixing member is an adhesive tape, both ends of the fixing member are bonded to the supporting part of the frame, and the ear parts of the plurality of optical films are bonded to the fixing member.

Preferably, the fixing member includes a fixing block and a fastener. The fixing block is fixed onto the frame through the fastener. A fixing cavity is formed between the fixing block and the supporting part of the frame, and the surface of the fixing cavity matches with a surface formed by successively stacking the ear parts of the plurality of optical films. The ear parts of the plurality of optical films are accommodated within the fixing cavity.

Preferably, the ear part is provided on each side of the film body of each optical film.

As another aspect of the present invention, a display device is provided. The display device includes a liquid crystal display panel and a backlight, wherein the backlight is the above backlight provided by the present invention. The liquid crystal display panel is provided above the top-most optical film.

Preferably, the end of the supporting part of the frame is located outside the effective display area of the liquid crystal display panel.

In the backlight provided by the present invention, an optical film set is fixed on a supporting part of a frame by using a fixing member, but is not pressed onto a light guide plate by using a supporting part. Accordingly, the supporting part may have a relative small width, that is, the end of the supporting part is located outside the effective display area of the liquid crystal display panel. Therefore, a black frame can be prevented from appearing in the effective display area when the display device including the backlight displays.

The fixing member covers ear parts of a plurality of optical films, such that the optical film set is pressed onto the frame. Therefore, the optical films can be prevented from being wrapped. Accordingly, it is possible to avoid defects such as black lines and moiré effect when the display device including the backlight displays. Furthermore, it is possible to avoid the damage to the lower polarizer of the liquid crystal display panel.

BRIEF DESCRIPTION OF THE DRAWINGS

The accompanying drawings are used for providing further understanding of the present invention, and constitute a part of the description. The accompanying drawings together with specific embodiments hereinafter are used for explaining the present invention, but are not intended to limit the present invention. In the drawings.

DETAILED DESCRIPTION OF THE EMBODIMENTS

Specific embodiments of the present invention will be described as below in details with reference to the accompanying drawings. It should be understood that the specific embodiments described herein are merely used for describing and explaining the present invention, but are not intended to limit the present invention.

Figure 3:
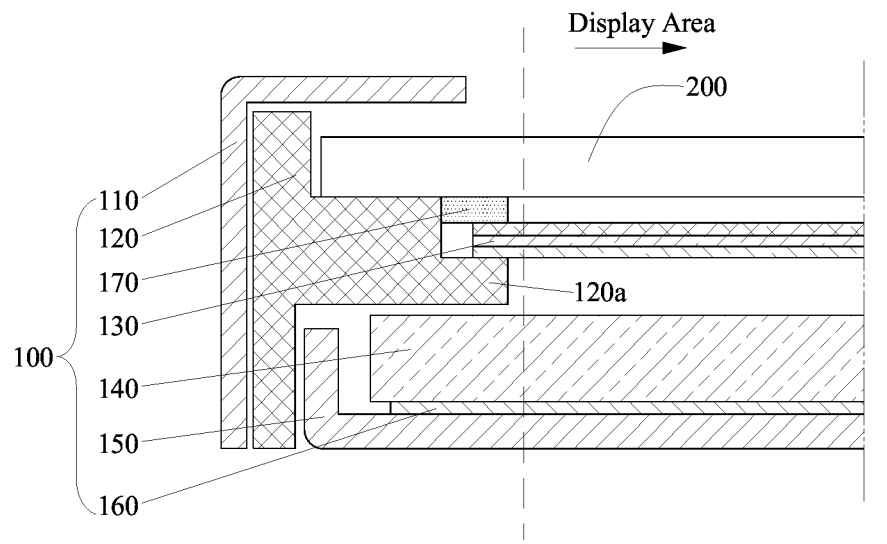
FIG. 3 is a section view schematically showing a part of a display device according to the present invention.
Figure 4:
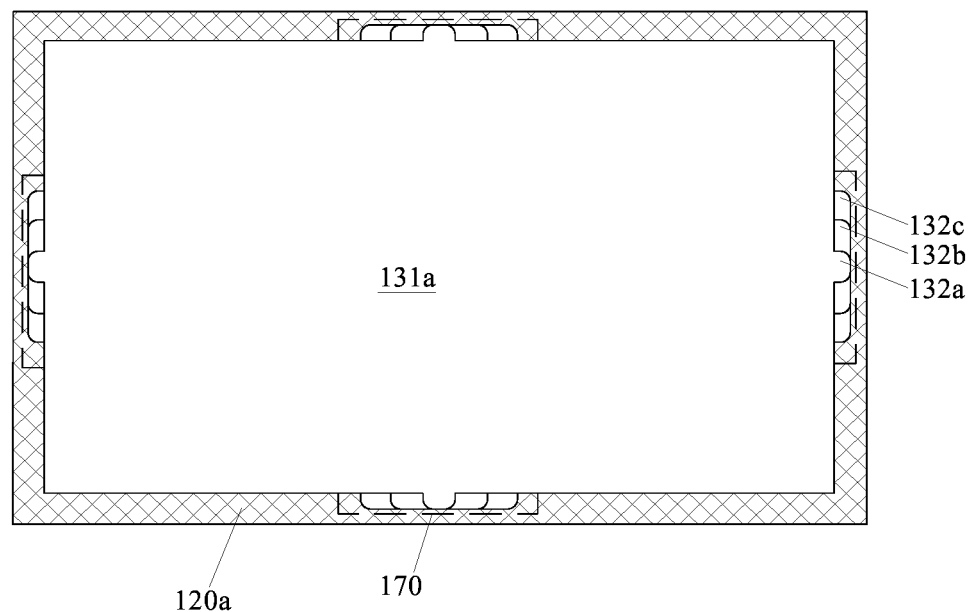
FIG. 4 is a schematic diagram showing the positional relationship between a frame, and an optical film set and a fixing member, in a backlight according to an embodiment of the present invention.
Figure 5:
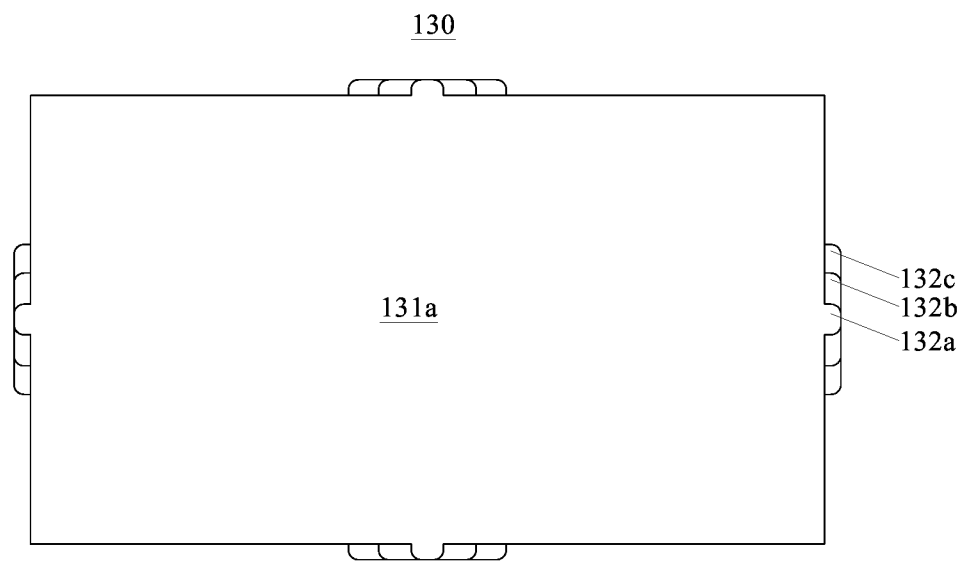
FIG. 5 is a plan view of an optical film set in a backlight according to the present invention.

As an aspect of the present invention, as shown in FIG. 3, a backlight is provided. The backlight includes a frame 120 and an optical film set 130, and the optical film set 130 includes a plurality of optical films that are successively stacked, wherein the backlight further includes a fixing member 170, the frame 120 includes a supporting part 120a protruding toward the middle part of the backlight, and the optical film set is provided on the supporting part 120a. As shown in FIG. 4 and FIG. 5, each optical film in the optical film set 130 includes a film body and ear parts protruding from the sides of the film body. In any two adjacent optical films, the boundary of at least one side of the ear part of the lower optical film extends beyond the boundary of the same side of the ear part of the upper optical film. The fixing member 170 covers the ear parts of the plurality of optical films in the optical film set 130, such that the optical film set 130 is fixed on the frame. The fixing member 170 fixes the relative positions among the plurality of optical films in the optical film set.

Figure 1:
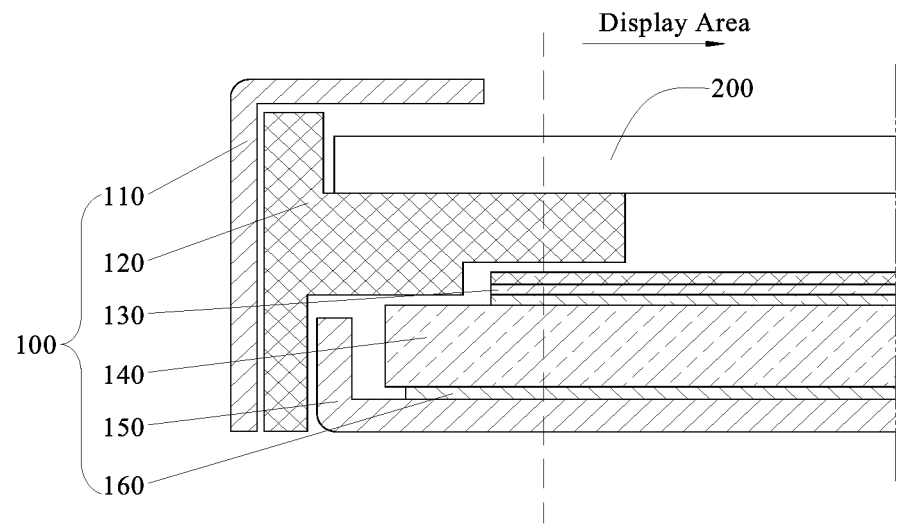
FIG. 1 is a section view schematically showing a part of a display device in the prior art.
Figure 2:
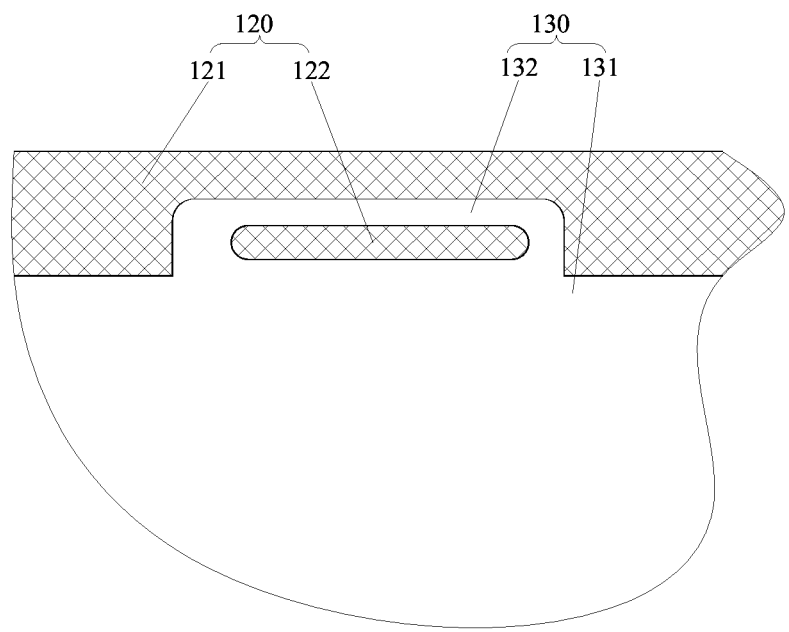
FIG. 2 is a plan view schematically showing a connection relationship between a frame and an optical film set in another display device in the prior art.

In the backlight provided by the present invention, as shown in FIG. 3, the optical film set 130 is fixed on the supporting part 120a of the frame 120 by using the fixing member 170, but is not pressed onto the light guide plate by using the supporting part as shown in FIG. 1. Accordingly, the supporting part 120a may have a relative small width, that is, the end of the supporting part 120a is located outside the effective display area of the liquid crystal display panel. Therefore, a black frame may be prevented from appearing in the effective display area when the display device including the backlight displays.

The fixing member 170 covers ear parts of the plurality of optical films in the optical film set 130, such that the optical film set 130 is pressed onto the frame 120. Therefore, the optical films can be prevented from being wrapped. Accordingly, it is possible to avoid defects such as black lines and moiré effect when the display device including the backlight displays. Furthermore, it is possible to avoid the damage to the lower polarizer of the liquid crystal display panel.

It should be noted that "the fixing member 170 covers ear parts of the plurality of optical films" refers to that the fixing member 170 extends beyond the boundary of the lowest optical film. The fact that the fixing member 170 may extend beyond the boundary of the lowest optical film and may fix the relative positions among the plurality of optical films in the optical film set means that the ear part of each optical film has a portion contacting with the fixing member 170. Accordingly, the fixing member 170 may fix the relative positions among the plurality of optical films in the optical film set 130. Therefore, it is possible to prevent the optical films from moving relative to each other. The defect that the contrast is relatively low when the display device including the backlight displays is avoided, and the display performance when the display device displays is optimized.

Accordingly, when the display device including the backlight provided by the present invention displays, no black frame appears in the effective display area of the display device, the black lines and the moiré effect will not be produced, and a higher contrast during displaying may be achieved. That is, the display device including the backlight provided by the present invention has excellent display performance.

Figure 6:
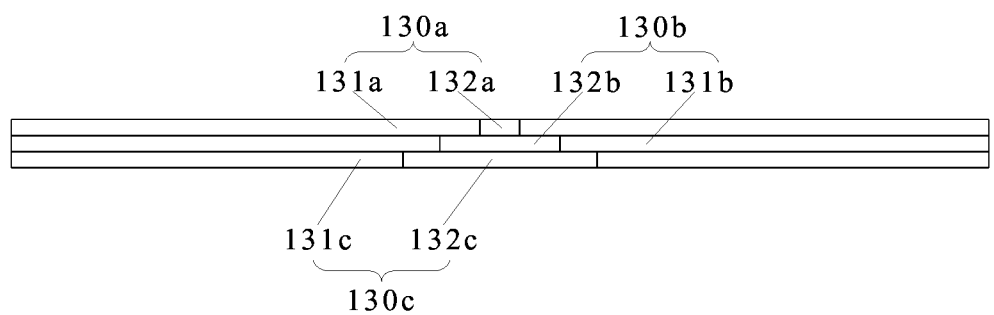
FIG. 6 is a side view of the optical film set shown in FIG. 5.

FIG. 4 to FIG. 6 also show a specific embodiment of the optical film set 130. In this embodiment, the optical film set 130 includes three optical films which, as shown in FIG. 6, are a top optical film 130a, a middle optical film 130b and a bottom optical film 130c, respectively.

In the present invention, the specific function of respective optical film is not particularly limited. For example, the top optical film 130a may be a diffuser film, the middle optical film 130b may be a prism film, and the bottom optical film 130c may be a diffuser film. Certainly, the optical films may be other types of optical films, in addition to the diffuser film and the prism film, and examples thereof will not be given one by one herein.

As shown in FIG. 5 and FIG. 6, the top optical film 130a includes a top film body 131a and a top ear part 132a, the middle optical film 130b includes a middle film body 131b and a middle ear part 132b, and the bottom optical film 130c includes a bottom film body 131c and a bottom ear part 132c. It can be seen from the FIG. 4 and FIG. 5 that, the area of the bottom ear part 132c is larger than that of the middle ear part 132b, which is larger than that of the top ear part 132a. As shown in FIG. 4, the fixing member 170 covers the top ear part 132a, the middle ear part 132b and the bottom ear part 132c. Moreover, the fixing member 170 is fixed on the supporting part 120a of the frame so that, with the fixing member 170, the optical film set 130 can be pressed to and fixed on the supporting part 120a, while the relative positions among the top optical film 130a, the middle optical film 130b and the bottom optical film 130c is also fixed.

In order to firmly fix the relative positions among the plurality of optical films, preferably, as shown in FIG. 4 to FIG. 6, in two adjacent optical films, both sides of the ear parts of the lower optical film extend beyond those of the ear parts of the upper optical film, respectively.

In the present invention, the specific structure of the fixing member 170 is not particularly limited, as long as the optical film set 130 can be fixed on the supporting part 120a of the frame 120 and the relative positions among the plurality of optical films in the optical film set 130 can be fixed. For example, as a specific embodiment of the present invention, as shown in FIG. 5, the fixing member 170 is an adhesive tape. Both ends of the fixing member 170 are bonded to the supporting part 120a of the frame 120. Because the boundaries of the ear part of the lower optical film are beyond those of the ear part of the upper optical film, the ear parts of all the optical films in the optical film set 130 are bonded to the fixing member 170. Therefore, the relative positions among the plurality of optical films are fixed. The fixing member 170 in this embodiment has a simple structure. It is easy to be realized and has low cost.

Figure 7:
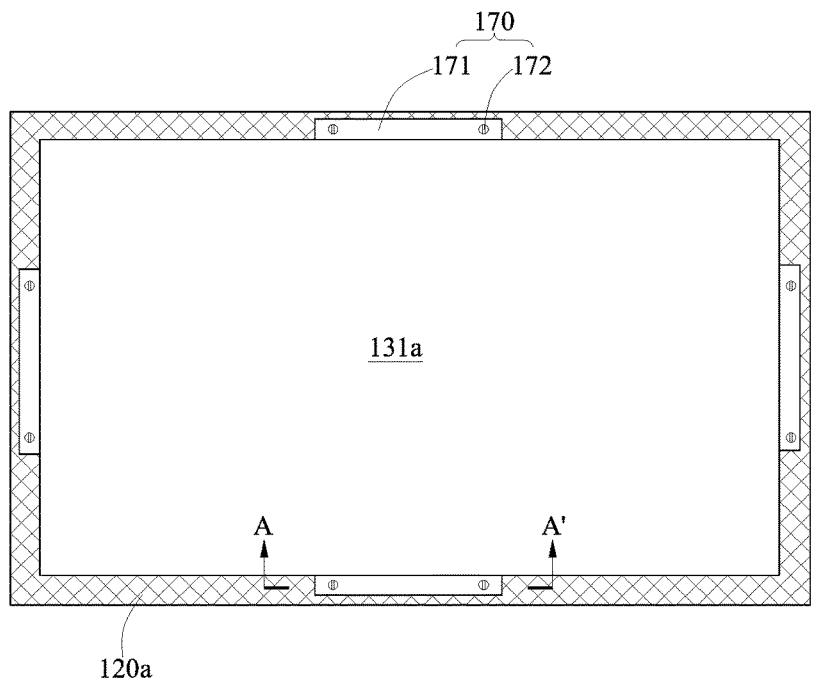
FIG. 7 is a schematic diagram showing the positional relationship between a frame, and an optical film set and a fixing member, in a backlight according to another embodiment of the present invention.
Figure 8:
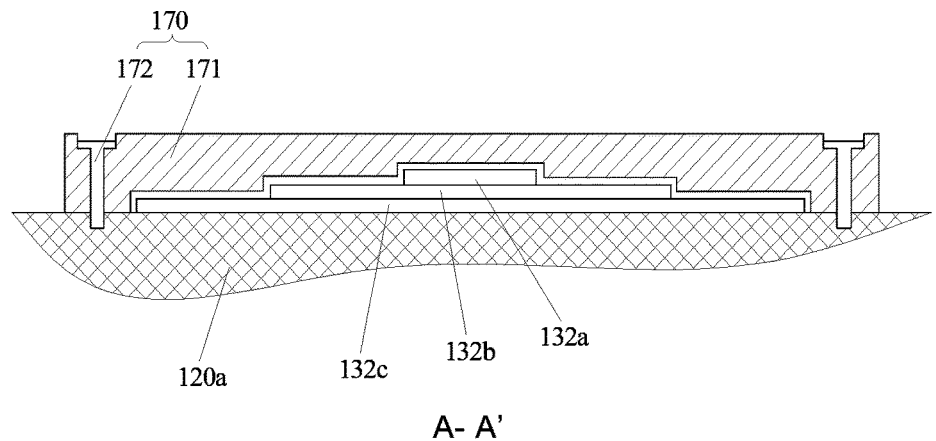
FIG. 8 is a section view taken along the line A-A' in FIG. 7.
Figure 9:
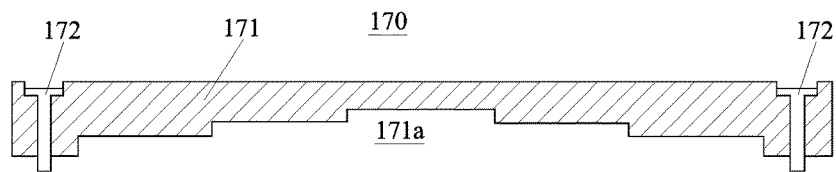
FIG. 9 is a section view of the fixing member shown in FIG. 8.

As another embodiment of the present invention, as shown in FIG. 7 to FIG. 9, the fixing member 170 includes a fixing block 171 and a fastener 172. The fixing block 171 is fixed on the supporting part 120a of the frame 120 through the fastener 172. A fixing cavity 171a is formed between the fixing block 171 and the supporting part 120a of the frame 120. The surface of the fixing cavity 171a matches with the surface formed by successively stacking the ear parts of the plurality of optical films. Therefore, the ear parts of the plurality of optical films are accommodated within the fixing cavity 171a.

As shown in FIG. 8, the ear parts of the plurality of optical films are stacked in a stair-step shape, and the surface of the fixing cavity 171a is of corresponding stair-step shape. Therefore, as shown in FIG. 8, it is possible to prevent the plurality of optical films from moving along the horizontal direction, and prevent the plurality of optical films from moving along the vertical direction. That is, it is possible to prevent the plurality of optical films from moving relative to each other. Specifically, the surface of the fixing cavity 171a in the horizontal direction may limit the movement of the plurality of optical films along the vertical direction, and the surface of the fixing cavity 171a in the vertical direction may limit the movement of the plurality of optical films along the horizontal direction.

In the embodiment as shown in FIG. 7 to FIG. 9, the strength of connection between the fixing member 170 and the frame 120 is relatively high. The connection is reliable and has a longer working life.

In the present invention, the specific structure of the fastener 172 is not particularly limited. For example, the fastener 172 may be a screw, a bolt or a rivet or the like. In addition, the material for making the fixing block 171 is not particularly limited. For example, the fixing block may be made of any one of silicone, steel or aluminum or the like.

As the fixing member, the person skilled in the art may select an adhesive tape or may select the fixing member 170 in the embodiment as shown in FIG. 7 to FIG. 10, according to the user's specific requirements on a display device including a backlight.

In order to firmly fix the optical film set on the frame, preferably, the ear part is provided on each side of the film body of each optical film in the optical film set. As shown in FIG. 4 and FIG. 5, there are four ear parts provided on the film body of each optical film.

The person skilled in the art should be understood that the backlight may further include a metal frame 110, a light guide plate 140, a rear plate 150 and a reflector plate 160. The frame 120 is provided between the side walls of the metal frame 110 and the side walls of the rear plate 150. The reflector plate 160 is provided on the rear plate 150. The light guide plate 140 is provided above the reflector plate 160. The supporting part 120a of the frame 120 limits the reflector plate 160 and the light guide plate 140 on the rear plate 150.

As another aspect of the present invention, as shown in FIG. 4, a display device is provided. The display device includes a liquid crystal display panel 200 and a backlight 100, wherein the backlight 100 is the above backlight provided by the present invention. The liquid crystal display panel 200 is provided above the top-most optical film.

The fixing member covers ear parts of the plurality of optical films, such that the optical film set is pressed onto the frame. Therefore, the optical films can be prevented from being wrapped. Accordingly, it is possible to avoid the occurrence of defects such as black lines and moiré effect when the display device including the backlight displays. Furthermore, it is possible to avoid the damage to the lower polarizer of the liquid crystal display panel.

In order to improve the display performance of the display device, preferably, the end of the supporting part 120a of the frame 120 is located outside the effective display area (that is, the left side of the dashed line in FIG. 3). Because the end of the supporting part 120a of the frame 120 is located outside the effective display area of the liquid crystal display panel 200, it will not affect the display on the liquid crystal display panel 200.

It should be understood that the forgoing embodiments are merely the exemplary embodiments used for explaining the principle of the present invention, but the present invention is not limited thereto. The person of ordinary skill in the art may make various variations and improvements without departing from the spirit and essence of the present invention, and these variations and improvements are construed as falling into the protection scope of the present invention.

What is claimed is:

1. A backlight, which includes a frame and an optical film set, the optical film set including a plurality of optical films that are successively stacked, wherein
the backlight further includes a fixing member, the frame includes a supporting part protruding toward the middle part of the backlight, the optical film set is provided on the supporting part, and each optical film in the optical film set includes a film body and an ear part protruding from a side of the film body; each ear part in each optical film is stacked on the ear part in the next adjacent optical film and is configured to contact the ear part in the next adjacent optical film, and in any two adjacent optical films, the boundary of at least one side of the ear part of the lower optical film extends beyond the boundary of the same side of the ear part of the upper optical film, the fixing member is configured to cover the ear parts of the plurality of optical films and contact at least a portion of a surface of the ear part of each optical film, such that the optical film set is fixed on the frame, the surface being a surface away from the supporting plate, and the fixing member can fix the relative positions among the plurality of optical films in the optical film set.

2. The backlight according to claim 1, wherein in the two adjacent optical films, both sides of the ear part of the lower optical film extend beyond both sides of the ear part of the upper optical film, respectively.

3. The backlight according to claim 1, wherein the fixing member is an adhesive tape, both ends of the fixing member are bonded to the supporting part of the frame, and the ear parts of the plurality of optical films are bonded to the fixing member.

4. The backlight according to claim 2, wherein the fixing member is an adhesive tape, both ends of the fixing member are bonded to the supporting part of the frame, and the ear parts of the plurality of optical films are bonded to the fixing member.

5. The backlight according to claim 1, wherein the fixing member includes a fixing block and a fastener, the fixing block is fixed onto the frame through the fastener, a fixing cavity is formed between the fixing block and the supporting part of the frame, the surface of the fixing cavity matches with a surface formed by successively stacking the ear parts of the plurality of optical films, and the ear parts of the plurality of optical films are accommodated within the fixing cavity.

6. The backlight according to claim 2, wherein the fixing member includes a fixing block and a fastener, the fixing block is fixed onto the frame through the fastener, a fixing cavity is formed between the fixing block and the supporting part of the frame, the surface of the fixing cavity matches with a surface formed by successively stacking the ear parts of the plurality of optical films, and the ear parts of the plurality of optical films are accommodated within the fixing cavity.

7. The backlight according to claim 1, wherein the ear part is provided on each side of the film body of each optical film.

8. The backlight according to claim 2, wherein the ear part is provided on each side of the film body of each optical film.

9. A display device, which includes a liquid crystal display panel and a backlight, the backlight includes a frame and an optical film set, the optical film set including a plurality of optical films that are successively stacked, wherein
the backlight further includes a fixing member, the frame includes a supporting part protruding toward the middle part of the backlight, the optical film set is provided on the supporting part, and each optical film in the optical film set includes a film body and an ear part protruding from a side of the film body; each ear part in each optical film is stacked on the ear part in the next adjacent optical film and is configured to contact the ear part in the next adjacent optical film, and in any two adjacent optical films, the boundary of at least one side of the ear part of the lower optical film extends beyond the boundary of the same side of the ear part of the upper optical film, the fixing member is configured to cover the ear parts of the plurality of optical films and contact at least a portion of a surface of the ear part of each optical film, such that the optical film set is fixed on the frame, the surface being a surface away from the supporting plate, and the fixing member can fix the relative positions among the plurality of optical films in the optical film set.

10. The display device according to claim 9, wherein in the two adjacent optical films, both sides of the ear part of the lower optical film extend beyond both sides of the ear part of the upper optical film, respectively.

11. The display device according to claim 9, wherein the fixing member is an adhesive tape, both ends of the fixing member are bonded to the supporting part of the frame, and the ear parts of the plurality of optical films are bonded to the fixing member.

12. The display device according to claim 10, wherein the fixing member is an adhesive tape, both ends of the fixing member are bonded to the supporting part of the frame, and the ear parts of the plurality of optical films are bonded to the fixing member.

13. The display device according to claim 9, wherein the fixing member includes a fixing block and a fastener, the fixing block is fixed onto the frame through the fastener, a fixing cavity is formed between the fixing block and the supporting part of the frame, the surface of the fixing cavity matches with a surface formed by successively stacking the ear parts of the plurality of optical films, and the ear parts of the plurality of optical films are accommodated within the fixing cavity.

14. The display device according to claim 10, wherein the fixing member includes a fixing block and a fastener, the fixing block is fixed onto the frame through the fastener, a fixing cavity is formed between the fixing block and the supporting part of the frame, the surface of the fixing cavity matches with a surface formed by successively stacking the ear parts of the plurality of optical films, and the ear parts of the plurality of optical films are accommodated within the fixing cavity.

15. The display device according to claim 9, wherein the ear part is provided on each side of the film body of each optical film.

16. The display device according to claim 10, wherein the ear part is provided on each side of the film body of each optical film.

17. The display device according to claim 9, wherein, the end of the supporting part of the frame is located outside the effective display area of the liquid crystal display panel.

* * * * *